Aug. 7, 1962     J. D. GRIGSBY     3,048,719
ELECTRICAL DUTY CYCLE CONTROL
Filed Dec. 3, 1959
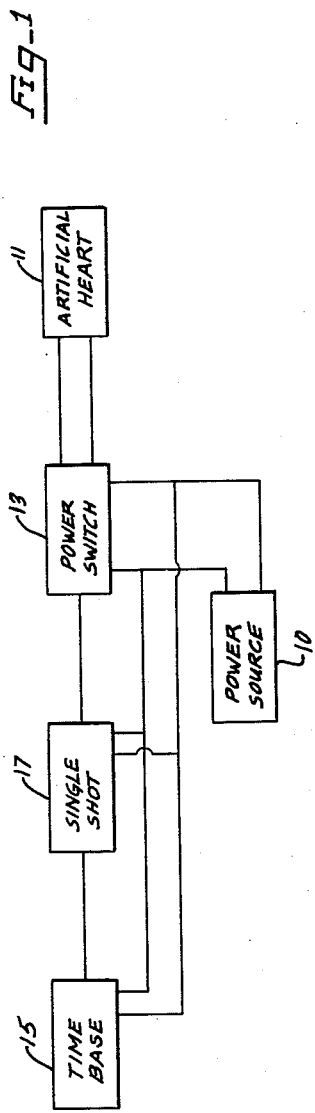
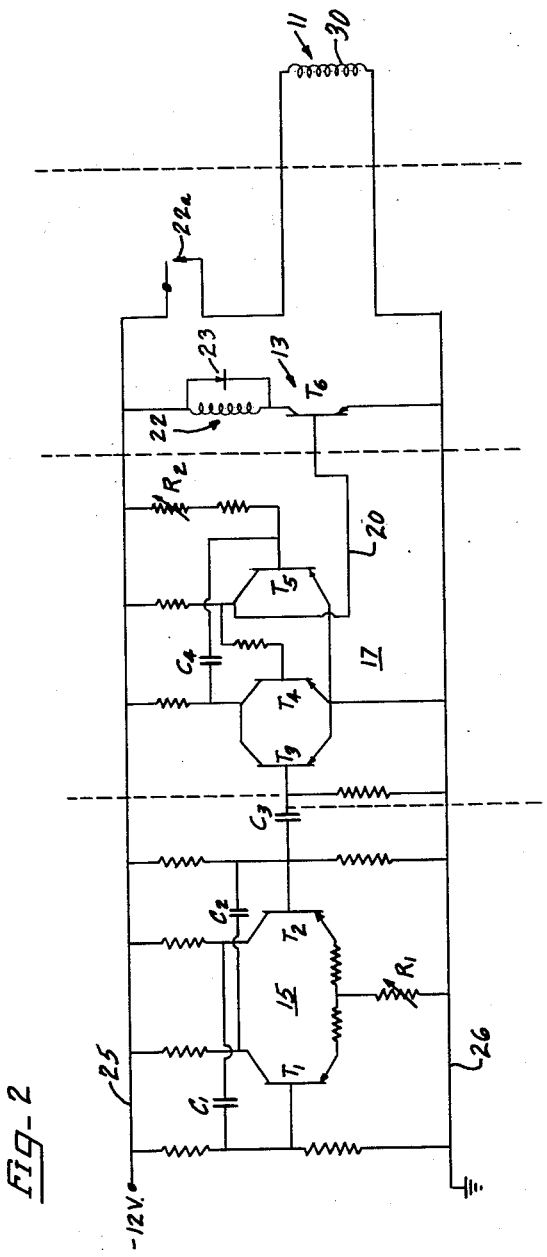
Inventor
John D. Grigsby

United States Patent Office 3,048,719
Patented Aug. 7, 1962

3,048,719
ELECTRICAL DUTY CYCLE CONTROL
John D. Grigsby, Willoughby, Ohio, assignor to Thompson Ramo Wooldridge Inc., Cleveland, Ohio, a corporation of Ohio
Filed Dec. 3, 1959, Ser. No. 857,130
3 Claims. (Cl. 307—132)

This invention relates to an electronic control device for shifting a switch between on and off conditions cyclically at an adjustable rate, and for adjusting the relative duration of the on and off conditions in each cycle, and particularly to an artificial heart control device for controlling delivery of electric power to the pumping mechanism of an artificial heart.

The present invention provides a particularly simple device which is well suited for controlling the speed of operation and power input of an artificial heart. The control is specifically illustrated as being under the command of the operator but it may be made sensitive to changes in the pumping requirements of the body so as to become completely automatic. As an example of a disclosure of an artificial heart to which the present invention may be applied, reference may be had to Samuel H. Norton U.S. application Serial No. 807,192 filed April 17, 1959, which application is assigned to the same assignee as the present application.

The two functions of the artificial heart which must be controlled are the pulse rate and the pulse duration. The pulse rate in a preferred embodiment is determined by means of an astable or free running multivibrator whose rate of repetition is adjustable by a variable resistance. The output from the astable multivibrator cyclically triggers a monostable multivibrator circuit to produce a series of output pulse from the monostable multivibrator circuit whose duration may be independently controlled by means of a second variable resistance. A power switch is provided which may be conductive only when there is a pulse output from the monostable multivibrator. The rate at which the power switch turns on and off is thus controlled by the astable multivibrator adjustment and the length of time that the switch is on during each cycle is determined by the monostable multivibrator adjustment.

When the power switch is conducting, current flows from the power source through the solenoids in the artificial heart. This current is not variable on any given pulse but the average power input to the solenoids is controlled by the pulse length and the pulse repetition rate. In this manner the average current flow through the heart solenoids is varied and controlled by the heart control device.

It is therefore an important object of the present invention to provide a novel control device for providing on and off signals at an adjustable repetition rate and of adjustable relative duration in each cycle for controlling the supply of power to a load.

A more specific object of the invention is to provide a simple and economical artificial heart control device for adjusting the pulse rate and the pulse duration of the heart pumping action.

Other objects, features and advantages of the present invention will be apparent from the following detailed description, taken in connection with the accompanying drawings, in which:

FIGURE 1 shows a block diagram of a control device in accordance with the present invention as applied to an artificial heart; and FIGURE 2 shows an illustrative detailed electric circuit diagram of an embodiment in accordance with FIGURE 1.

As shown on the drawings:

FIGURES 1 and 2 illustrate the concepts of the present invention as applied to an artificial heart such as disclosed in Norton Serial No. 807,192 mentioned above. In its broad aspects, however, the invention is not limited to an artificial heart control device but is applicable generally where on-off control of adustable repetition rate and adjustable duration is desired.

In FIGURE 1 supply of power from a power source 10 to an artificial heart 11 is controlled by means of a power switch component 13. The power source 10 also supplies energy to a time base circuit 15 and a single-shot circuit 17. The time base circuit 15 generates a periodic output signal whose rate of repetition is adjustable either manually or automatically in response to any desired conditions such as changes in the pumping requirements of the body. The single-shot circuit 17 is connected between the time base circuit 15 and the power switch 13 and is actuated by the periodic output signal from the time base circuit to transmit an output pulse to the power switch means 13 in each cycle of the time base circuit. The single-shot means 17 is adjustable to control the duration of the output pulses therefrom to correspondingly control the time in each cycle during which the power switch 13 is closed for delivering power from the source 10 to the artificial heart 11. The adjustment of the duration of the output pulses from the single-shot 17 may be manual or may be automatic in response to any desired conditions such as changes in the pumping requirements of the body. The time base unit thus controls the number of times per minute the power switch is closed, i.e. the pulse rate, and the single shot unit controls the length of time the power switch is closed in each cycle, i.e. the pulse duration.

FIGURE 2 illustrates a suitable circuit in accordance with the block diagram of FIGURE 1, by way of example and not of limitation. In the embodiment of FIGURE 2, the time base unit 15 comprises an astable or free running multivibrator circuit. The output of the multivibrator 15 may be substantially a square wave whose repetition rate is adjustable, for example by means of the resistor $R_1$ indicated in FIGURE 2. The multivibrator 15 may comprise a conventional circuit including transistors $T_1$ and $T_2$ and capacitors $C_1$ and $C_2$. The output of the astable multivibrator 15 may be coupled by means of capacitor $C_3$ to single-shot unit 17.

By way of example and not of limitation, the single-shot unit 17 may comprise a monostable multivibrator whose output pulse duration is adjustable, for example by means of variable resistor $R_2$. The monostable multivibrator has been illustrated as comprising a conventional circuit including transistors $T_3$, $T_4$ and $T_5$ and capacitor $C_4$. The output of the single shot circuit 17 is connected by means of lead 20 to power switch 13, which may comprise a relay driver circuit including transistor $T_6$, in such a manner as to energize relay 22 only when the single-shot circuit 17 is in the unstable state. The relay 22 is shown shunted by a rectifier accommodating current flow opposite to that normally produced through the coil 22 by the —12 volts applied to line 25. In other words, the arrow head associated with rectifier 23 shows the direction of low resistance for positive current flow. The relay coil 22 operates a set of relay contacts indicated at 22a. Power is supplied to each of the circuits 13, 15 and 17 in FIGURE 2 by means of power supply lines 25 and 26. By way of example, a twelve volt battery may have its negative terminal connected to the line 25 and its positive terminal connected to the line 26 which may also be grounded.

The driving means for the artificial heart may comprise a solenoid indicated at 30 in FIGURE 2 and contacts 22a control the supply of power to the solenoid from the supply lines 25 and 26.

Summary of Operation

In operation of the embodiment of FIGURE 2, the astable multivibrator 15 is adjusted by means of resistor $R_1$ to provide a repetition rate corresponding to the number of closures of the contacts 22a desired for a given time period, and the resistor $R_2$ of the astable multivibrator 17 is adjusted in accordance with the time the contacts 22a are to be closed in each cycle. The frequency range of the time base unit or astable multivibrator unit 15 is limited to prevent either too slow or too rapid a heart beat rate. The single-shot or monostable multivibrator unit 17 is normally in its stable state with no output at line 20. When a trigger signal is applied to the input of the single-shot unit from the time base unit 15, the single-shot unit 17 switches to its unstable state and maintains this state for a length of time dependent on the setting of the resistor $R_2$. The power switch device 13 may be responsive to the single-shot unit 17 in its unstable state as illustrated in FIGURE 2.

The repetition rate control, i.e. resistor $R_1$ in the illustrated embodiment, determines the quantity of blood that is pumped per unit time by the artificial heart 11, and the pulse length control, i.e. adjustable resistor $R_2$ in the illustrated embodiment, determines the back pressure against which the heart will deliver blood to the body's circulatory system. The settings of resistors $R_1$ and $R_2$ may be controlled automatically, for example in response to changes in the pumping requirements of the body as will be readily understood by those skilled in the art.

It will be apparent that many modifications and variations may be effected without departing from the scope of the novel concepts of the present invention.

I claim as my invention:

1. A control device for delivering a pulse output of adjustable repetition rate and adjustable duration comprising time base means for generating a periodic output signal and having means for adjusting the rate of repetition of the periodic output signal, and means coupled to said time base means for receiving said periodic output signal and responsive to said periodic output signal to initiate a series of output pulses at a rate in accordance with the rate of repetition of said periodic output signal, said output pulse initiating means having means for adjusting the duration of said output pulses.

2. A control device comprising time base means for generating a periodic output signal and having means for adjusting the rate of repetition of the periodic output signal, monostable means coupled to said time base means for receiving said periodic output signal and responsive to said periodic output signal to initiate a series of output pulses at a rate in accordance with the rate of repetition of said periodic output signal, said monostable means having means for adjusting the duration of said output pulses, and switch means coupled to the monostable means to receive said output pulses therefrom and shiftable between a conducting and a non-conducting condition for controlling application of power to a load, said switch means being responsive to the initiation of each output pulse from the monostable means to shift from one of its conditions to the other of its conditions and being operative to remain in the other of its conditions for a time proportional to the duration of the output pulse.

3. An artificial heart control device comprising electrically energizable heart driving means for actuating an artificial heart, power source means for supplying electric power to said heart driving means, power switch means connected between said power source means and said heart driving means and shiftable between a conducting and a non-conducting condition for controlling supply of power from said power source means to said heart driving means, astable multivibrator means for producing a periodic output signal and having means for adjusting the repetition rate of the periodic output signal, and monostable multivibrator means connected between said astable multivibrator means and said power switch means and responsive to said periodic output signal in each cycle thereof to transmit an output pulse to said power switch means, said monostable multivibrator means having means for adjusting the duration of said output pulses, and said power switch means being responsive to said output pulses to shift from one of its conditions to the other of its conditions and being operative to maintain said other condition for a time proportional to the duration of said output pulses.

References Cited in the file of this patent

UNITED STATES PATENTS 2,735,009    Harry  ---------------- Feb. 14, 1956